United States Patent
Pearson et al.

(10) Patent No.: US 7,650,394 B2
(45) Date of Patent: Jan. 19, 2010

(54) SYNCHRONIZING EMAIL RECIPIENT LISTS USING BLOCK PARTITION INFORMATION

(75) Inventors: Malcolm E. Pearson, Kirkland, WA (US); Jeffrey Kay, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 421 days.

(21) Appl. No.: 11/532,352

(22) Filed: Sep. 15, 2006

(65) Prior Publication Data

US 2008/0071867 A1      Mar. 20, 2008

(51) Int. Cl.
G06F 15/16    (2006.01)
G06F 17/30    (2006.01)

(52) U.S. Cl. ............... 709/219; 709/206; 709/248; 707/7

(58) Field of Classification Search ......... 709/208–216, 709/220–222, 248; 370/254–258; 707/7
See application file for complete search history.

(56) References Cited

U.S. PATENT DOCUMENTS

| | | | |
|---|---|---|---|
| 4,611,310 A * | 9/1986 | Durbin | 365/230.01 |
| 6,243,746 B1 | 6/2001 | Sondur et al. | |
| 6,401,110 B1 | 6/2002 | Freitas et al. | |
| 6,445,710 B1 | 9/2002 | Perlman et al. | |
| 6,516,394 B1 | 2/2003 | Don et al. | |
| 7,058,848 B2 | 6/2006 | Sicola et al. | |
| 7,317,907 B2 * | 1/2008 | Linkert et al. | 455/412.1 |
| 2003/0065761 A1 | 4/2003 | Cereja et al. | |
| 2003/0158928 A1 | 8/2003 | Knox et al. | |
| 2006/0015515 A1 | 1/2006 | Collazo | |
| 2006/0047907 A1 | 3/2006 | Shiga et al. | |
| 2006/0047928 A1 | 3/2006 | Bhasin et al. | |
| 2006/0107007 A1 | 5/2006 | Hirakawa et al. | |

OTHER PUBLICATIONS

Lynch, Niall, "Supporting Disconnected Operation in Mobile Corba," Sep. 1999, Dissertation paper, University of Dublin, https://www.cs.tcd.ie/publications/tech-reports/reports.99/TCD-CS-1999-66.pdf.

Marti, Sergio and Venky Krishnan, "Carmen: A Dynamic Service Discovery Architecture," Sep. 16, 2002, © Hewlett-Packard Company 2002, http://www.hpl.hp.com/techreports/2002/HPL-2002-257.pdf.

* cited by examiner

Primary Examiner—Joseph E Avellino
Assistant Examiner—Afshawn Towfighi
(74) Attorney, Agent, or Firm—Perkins Coie LLP (57) ABSTRACT

A client replication component of a replication system sends to a server replication component of the replication system a request to update a target email recipient list. In response to the request, the server replication component sends to the client replication component a list of hashed blocks representing the target email recipient list. The client replication component generates a list of hashed blocks representing a local email recipient list, and compares the locally-generated list of hashed blocks to the list of hashed blocks received from the server replication component to identify the hashed blocks in the lists of hashed blocks that are different. The client replication component then sends to the server replication component the blocks of the local email recipient list that correspond to the identified, different hashed blocks for updating on the target email recipient list.

17 Claims, 8 Drawing Sheets

FIG. 1

- (202) Request to update recipient list
- (204) Receive list of hashed blocks
- (206) Identify different recipient list blocks using received list of hashed blocks and locally-generated list of hashed blocks
- (208) Send different recipient list blocks for updating
- (210) Update recipient list with received different recipient list blocks

SYNCHRONIZING EMAIL RECIPIENT LISTS USING BLOCK PARTITION INFORMATION

BACKGROUND

Electronic mail (email) communications have quickly become the primary communication vehicle for many corporations and enterprises due to its many advantages over non-electronic communications such as postal mail. These advantages include low cost, rapid delivery, ease of storage, and so on.

A corporation can deploy an edge server at the periphery of the corporate network, typically behind the corporate firewall, to secure their email communications. One function of the edge server is to receive all of the incoming email messages for the email clients configured in the corporation's email infrastructure, verify the email addresses, and relay the email messages to appropriate servers for delivery to the mailboxes. This allows the edge servers to verify the email addresses and to reject undesirable email messages, such as SPAM, before the messages are accepted into the corporate network. In order to perform this function, the edge server requires access to a complete and updated email recipient list, which is typically maintained on a directory server on the corporate network. Given the relatively high bandwidth provided by the corporate network (e.g., gigabyte Ethernet), the cost of periodically replicating the entire email recipient list from the directory server to the edge server whenever there is a change to the email recipient list is not significant. Even when the volume of email messages necessitates the deployment of multiple edge servers, periodic replication of the entire email recipient list from the directory server to each of the edge servers is still feasible as long as the size of the email recipient list is not prohibitively large.

As the volume of email messages increases and corporations become faced with the growing challenge of maintaining the integrity of their emails, corporations are increasingly turning to hosted email solutions. In some hosted email solutions, the hosted email service provider provides the edge servers within its hosted email service cloud (i.e., the collection of servers that provide the hosted email service functionality) replacing the edge servers that would previously have been deployed on premise. The edge servers deployed within the hosted email service cloud still require access to the complete and updated email recipient list that is provided on a directory server on the corporate network. Because the connectivity between the corporate network and the hosted email service cloud is typically via a much lower bandwidth connection, such as a T-1 connection, the cost associated with periodically replicating the entire email recipient list from the directory server on the corporate network to the edge server within the hosted email service cloud whenever there is a change to the email recipient list may become prohibitive.

SUMMARY

A method and system for optimally replicating electronic mail ("email") recipient lists is provided. A replication system uses several variations of a blocking technique to replicate a local (source) email recipient list onto a target (destination) email recipient list by updating just the blocks or sections of the target email recipient list that are different from their current corresponding blocks in the local email recipient list. A client replication component of the replication system sends to a server replication component of the replication system a request to update a target email recipient list. In response to the request, the server replication component sends to the client replication component a list of hashed blocks (compressed views of blocks of the target email recipient list) representing the target email recipient list. The client replication component generates a list of hashed blocks representing a local email recipient list, and compares the locally-generated list of hashed blocks to the list of hashed blocks received from the server replication component to identify the hashed blocks in the lists of hashed blocks that are different. The client replication component then sends to the server replication component the blocks of the local email recipient list that correspond to the identified, different hashed blocks for updating on the target email recipient list.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

A method and system for optimally replicating electronic mail ("email") recipient lists is provided. In some embodiments, a replication system uses several variations of a blocking technique to replicate a local (source) email recipient list onto a target (destination) email recipient list by updating just the blocks or sections of the target email recipient list that are different from their current corresponding blocks in the local email recipient list. The local or source email recipient list is the email recipient list that is to be replicated on the target email recipient list. The email recipient lists (e.g., the local email recipient list and the target email recipient list) may be implemented as a list of records, where each record contains (corresponds to) an indication of an email recipient in the email recipient list. A client replication component of the replication system has access to the local email recipient list and identifies the block or blocks of the local email recipient list that are different from their corresponding block or blocks of the target email recipient list. The client replication component sends only the identified blocks of the local email recipient list to a server replication component of the replication system that has access to the target email recipient list. The server replication component receives the blocks of the local email recipient list that are sent by the client replication component and replaces or updates the corresponding blocks of the target email recipient list with the received blocks of the local email recipient list. Because the replication system transfers only the blocks of the target email recipient list that are different from their corresponding blocks of the local email recipient list, the replication system minimizes the data transfer and is able to optimally replicate the local email recipient list even over limited bandwidth connections between the client replication component and the server replication component. As used herein, the terms "client replication component" and "server replication component" are just designations for two components (of which there may be multiple instances) of the replication system and do not connote a client and a server in the traditional client-server sense where the client typically executes on a personal computer or a workstation and relies on a server to perform some operations. As such, the client replication component and the server replication component may be considered peer components that work in conjunction to replicate a local email recipient list onto a target email recipient list.

In some embodiments, the replication system identifies the differences between a local email recipient list and a target email recipient list by first partitioning the email recipient lists into blocks, and then identifying and updating the blocks of the target email recipient list that are different from their corresponding blocks of the local email recipient list. In a typical scenario, the client replication component sends the server replication component a request to update a target email recipient list. For example, the client replication component may periodically update the target email recipient list in order to synchronize the target email recipient list to be consistent with the local email recipient list. Upon receiving the request, the server replication component partitions or splits the records of the target email recipient list into blocks of records. In some embodiments, the server replication component may partition the target email recipient list based on an alphabetized ordering of the email aliases (email names) represented by the records in the target email recipient list. For example, the records in the target email recipient list representing email aliases starting with the letter "a" or "A" can be placed in one block, the records in the target email recipient list representing email aliases starting with the letter "b" or "B" can be placed in another block, and so on for the other remaining characters of the alphabet. In some embodiments, the server replication component may order the records in each block based on a predetermined random identifier that is associated with the records, such as, by way of example, a time of creation of the record, an email alias represented by the record, a title associated with the email alias represented by the record, a group designation associated with the email alias represented by the record, and the like. In some embodiments, the server replication component may partition the target email recipient list based on a time of creation of the records in the target email recipient list. Having partitioned the target email recipient list into blocks of records, the server replication component generates a compressed value for each of the blocks of records. The compressed value for a block of records represents a compressed view of the block of records. For example, the server replication component can create a hash value for each of the blocks of records. The server application component may use any of a variety of well-known hash algorithms, such as an MD4, to generate a hash or a compressed value of each of the blocks. A hash algorithm is a function that takes in an arbitrarily long string and produces a fixed-size result having sufficient length and collision-resistance to reduce the probability of two blocks producing the same value. As such, the compressed view of a block of records consumes a very small number of bytes when compared to the number of bytes of the block of records, yet still provides a high probability to detect matches or differences. Having generated the compressed view of each of the blocks of records, the server replication component creates a list of hashed blocks (compressed values) that represent the target email recipient list and sends the list of hashed blocks to the client replication component in response to the previously received request to update the target email recipient list.

Upon receiving the list of hashed blocks, the client replication component partitions the records of the local email recipient list into corresponding blocks of records and generates a compressed value for each of the blocks of records. The client replication component partitions the records of the local email recipient list using the same technique used by the server replication component to partition the records of the target email recipient list. For example, if the server replication component partitioned the target email recipient list into blocks of a predetermined number of records, such as 500 records, then the client replication component also partitions the local email recipient list into blocks of the same predetermined number of records. If the server replication component partitioned the target email recipient list into blocks of a predetermined number of records, then the server replication component may specify the starting and ending email alias for each block of records. In another example, if the server replication component partitioned the target email recipient list based on an alphabetized ordering of the email aliases represented by the records in the target email recipient list, then the client replication component also partitions the local email recipient list based on the same alphabetized technique used by the server replication component. Similarly, the client replication component generates a compressed view of each of the blocks of records of the local email recipient list using the same technique used by the server replication component to generate the compressed view of the blocks of records of the target email recipient list. Having generated the compressed view of each of the blocks of records of the local email recipient list, the client replication component creates a list of hashed blocks (compressed values) representing the local email recipient list. The client replication component then compares each hashed block in the locally-generated list of hashed blocks to its corresponding hashed block in the list of hashed blocks that was received from the server replication component and identifies the hashed block or hashed blocks that are different. The hashed blocks that are different represent the blocks of the email recipient lists that are different. Stated differently, the different hashed blocks represent the blocks of the local email recipient list that are different from the corresponding blocks of the target email recipient list. For each hashed block that is different, the client replication component sends to the server replication component the block of records of the local email recipient list corresponding to the hashed block. Upon receiving the block of records (the block of records of the local email recipient list that was identified to be different than its corresponding block of records of the target email recipient list), the server replication component updates the corresponding block of records of the target email recipient list to be consistent with the received block of records. For example, the server replication component can replace the corresponding block of records of the target email recipient list with the block of records received from the client replication component.

In some embodiments, the server replication component sends with the list of hashed blocks information that specifies how the server replication component partitioned the target email recipient list into blocks of records in order to generate the list of hashed blocks. The records in the email recipient lists (the local email recipient list and the target email recipient list) are typically maintained according to an order. The order may be based, for example, on an ordering of the email alias represented by each record. The block partition information sent by the server replication component allows the client replication component to partition the local email recipient list to create blocks of records of the local email recipient list that correspond to the blocks of records of the target email recipient list which were used by the server replication component to generate the list of hashed blocks. For example, the block partition information may indicate that the first block includes the first X number of records in the target email recipient list, that the second block includes the subsequent Y number of records in the target email recipient list, and so on. As another example, the block partition information may indicate that all of the records in the target email recipient list that represent email aliases that start with the letters "a" or "A" are to be included in the first block, that all of the records in the target email recipient list that represent email aliases that start with the letters "b" or "B" are to be included in the second block, and so on. As still another example, the block partition information for one of the blocks may indicate that all of the records in the target email recipient list that are between the email alias for "Bill" and the email alias for "Jon," inclusive, are contained in this block of records, and so on. Thus, the client replication component does not require a priori knowledge of the technique used by the server replication component to generate the blocks of records. The client replication component can apply the block partition information received from the server replication component to the local email recipient list to generate the blocks of records of the local email recipient list that correspond to the blocks of records of the target email recipient list, thus allowing the client replication component to generate a list of hashed blocks to compare to the list of hashed blocks received from the server replication component. In some embodiments, the server replication component sends block partition information for each of the hashed blocks in the list of hashed blocks. For example, the block partition information may include an indication of a beginning record of the block of records, an indication of the ending record in the block of records, and an indication of the number of records in the block of records. The client replication component can then use the block partition information to partition the records of the local email recipient list into blocks of records that correspond to the blocks of records of the target email recipient list used to generate the list of hashed blocks received from the server replication component. Having partitioned the records in the local email recipient list into blocks of records, the client replication component can generate a compressed value (hashed block) for each of the blocks of records, and compare the locally-generated hashed blocks to their corresponding hashed blocks in list of hashed blocks that was received from the server replication component to identify the hashed block or hashed blocks that are different.

In some embodiments, the replication system allows the client replication component and the server replication component to negotiate the partitioning of their respective email recipient lists. For example, upon identifying a hashed block that is different, the client replication system can send to the server replication component a request to further partition (e.g., repartition) the block of records of the target email recipient list that corresponds to the identified, different hashed block into subblocks. Upon receiving the request, the server replication component can repartition the indicated block of records of the target email recipient list into subblocks, generate a compressed value for each of the subblocks, generate a list of the compressed values (hashed subblocks), and send to the client replication component the list of hashed subblocks. Upon receiving the list of hashed subblocks, the client replication component can repartition the block of records of the local email recipient list that correspond to the identified, different hashed block into subblocks, generate a list of hashed subblocks from the subblocks, and compare the locally-generated list of hashed subblocks to the list of hashed subblocks received from the server replication component to identify the hashed subblocks that are different. For each of the smallest identified hashed subblock that is different, the client replication component sends to the server replication component the subblock of records of the local email recipient list corresponding to the hashed subblock. Upon receiving the subblock of records (the subblock of records of the local email recipient list that was identified to be different than its corresponding subblock of records of the target email recipient list), the server replication component updates the corresponding subblock of records of the target email recipient list to be consistent with the received subblock of records. In some embodiments, the client replication component can further request repartitioning of a subblock that is identified to be different. In some embodiments, the server replication component sends with the list of hashed subblocks information (subblock partition information) that specifies how the server replication component repartitioned the block of records of the target email recipient list into subblocks of records in order to generate the list of hashed subblocks. The subblock partition information allows the client replication component to repartition the block of records of the local email recipient list into subblocks of records that correspond to the subblocks of records of the target email recipient list used to generate the list of hashed subblocks received from the server replication component. In some embodiments, the client replication component sends with the request to repartition a block of records of the target email recipient list information that specifies how the server replication component is to repartition the indicated block of records of the target email recipient list. By repartitioning the different blocks of records, the replication system is able to further reduce the amount of data that needs to be sent from the client replication component to the server replication component to replicate the local email recipient list.

Figure 1:
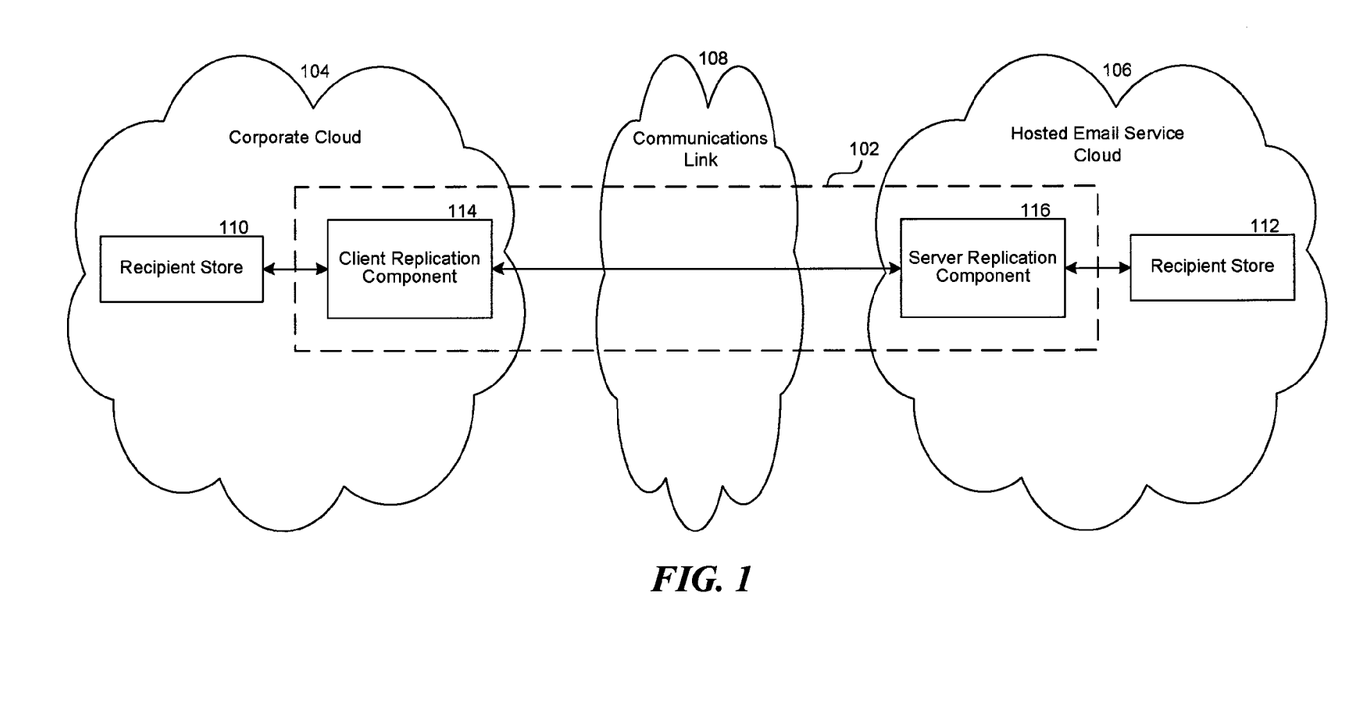
FIG. 1 is a high-level block diagram that illustrates an environment in which a replication system executes, according to some embodiments.

FIG. 1 is a high-level block diagram that illustrates an environment in which a replication system 102 executes, according to some embodiments. The environment includes a corporate cloud 104 representing a corporate network of a business enterprise and a hosted email service cloud 106 representing an email infrastructure of a hosted email service provider, each coupled to a communications link 108. For example, the business enterprise may be outsourcing the management of its email infrastructure to the hosted email service provider. The business enterprise may maintain an email recipient list for the email recipients supported by the business enterprise in a recipient store 110 included in the corporate cloud. In order to provide the hosted email services to the business enterprise, the hosted email service provider requires knowledge of the email recipients who are specified in the email recipient list. But the hosted email service provider may not have access to the email recipient list that is maintained on the recipient store located within the corporate cloud. To provide the hosted email service provider knowledge of the email recipients supported by the business enterprise, the email recipient list on the recipient store in the corporate cloud is replicated outside of the corporate cloud, for example, on a recipient store 112 included in the hosted email service cloud. The replication system includes a client replication component 104 and a server replication component 106 that work in conjunction to provide replication of data at one location to another location. As depicted, the client replication component can execute within the corporate cloud and the server replication component can execute within the hosted email service cloud, and the components can work in conjunction to replicate the email recipient list that is maintained by the business enterprise on the recipient store in the corporate cloud onto the recipient store in the hosted email service cloud, thus providing the hosted email service access to the email recipient list. Only one client replication component and one server replication component are shown in the replication system illustrated in FIG. 1 for simplicity and one skilled in the art will appreciate that the replication system may contain a different number of client replication components and/or server replication components. Similarly, only one recipient store is shown in the corporate cloud and only one recipient store is shown in the hosted email service cloud in FIG. 1 for simplicity and one skilled in the art will appreciate that the corporate cloud and/or the hosted email service cloud can contain a different number of recipient stores.

The computing device on which the replication system is implemented may include a central processing unit, memory, input devices (e.g., keyboard and pointing devices), output devices (e.g., display devices), and storage devices (e.g., disk drives). The memory and storage devices are non-transitory computer-readable storage media that may contain instructions that implement the replication system. In addition, the data structures and message structures may be stored or transmitted via a data transmission medium, such as a signal on a communications link. Various communication links may be used, such as the Internet, a local area network, a wide area network, a point-to-point dial-up connection, a cell phone network, and so on.

Embodiments of the replication system, including the client replication component and the server replication component may be implemented in various operating environments that include personal computers, server computers, hand-held or laptop devices, multiprocessor systems, microprocessor-based systems, programmable consumer electronics, digital cameras, network PCs, minicomputers, mainframe computers, network devices, distributed computing environments that include any of the above systems or devices, and so on. The computer systems may be cell phones, personal digital assistants, smart phones, personal computers, programmable consumer electronics, digital cameras, and so on.

The replication system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

Figure 2:
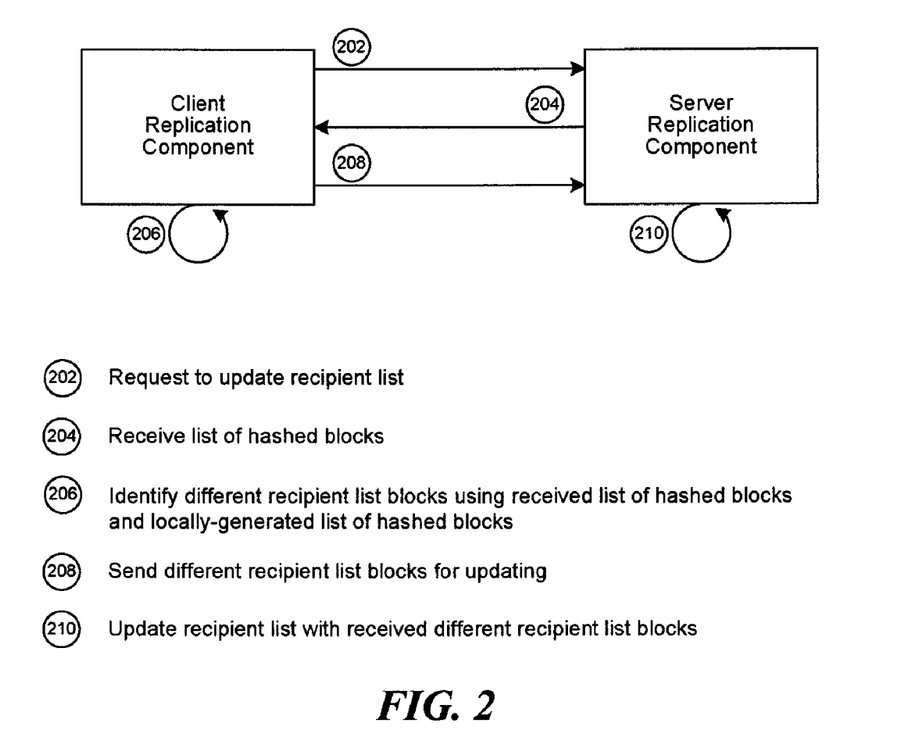
FIG. 2 is a message flow diagram illustrating the flow of information among various components of the replication system, according to some embodiments.

FIG. 2 is a message flow diagram illustrating the flow of information among various components of the replication system, according to some embodiments. The client component of the replication system periodically executes on a computing system corporate within the corporate cloud to replicate a local email recipient list (i.e., the email recipient list that is maintained on the recipient store in the corporate cloud) onto a target email recipient list (i.e., the email recipient list that is accessible by the hosted email service provider). Upon detecting a need to ensure that the contents of the target email recipient list matches the contents of the local email recipient list, the client replication component executing within the corporate cloud sends to the server replication component executing within the hosted email service cloud a request to update the target recipient list (stage 202). For example, the client replication component may be configured to periodically (e.g., 2 AM each day) check to ensure that the local email recipient list and the target email recipient list are synchronized. In another example, the client replication component may be invoked, for example, by a system administrator, to synchronize the target email recipient list with the local email recipient list. The system administrator may invoke the client application component to update the target email recipient list to be synchronized with the local email recipient list upon making a change (or a predetermined number of changes) to the local email recipient list. Manually invoking the client replication component allows the two email recipient lists to be synchronized at any time, without waiting for, for example, the periodic "batch" or scheduled execution of the client replication component. Subsequent to sending the request to update the target email recipient list, the client replication component receives from the server replication component a list of hashed blocks (stage 204). The list of hashed blocks is a list of substantially smaller representations of the literal contents of the blocks (segments) of the target email recipient list. The client replication component then generates a list of hashed blocks from the contents of its local email recipient list, and compares the locally-generated list of hashed blocks to the list of hashed blocks received from the server replication component in order identify the hashed blocks that are different (stage 206). The hashed blocks that are different represent the blocks of the two email recipient lists (the local email recipient list and the target email recipient list) that are different. The client replication component then sends to the server replication component the literal blocks of the local email recipient list that correspond to the hashed blocks that were identified to be different for updating in the target email recipient list (stage 208). Upon receiving the literal blocks of the local email recipient list, the server replication component updates the target email recipient list with the received blocks of the local email recipient list, thus synchronizing the target email recipient list with the local email recipient list (stage 210).

In some embodiments, the server replication component may periodically send to the client replication component, without a request from the client replication component, a list of hashed blocks. The client replication component can then generate a list of hashed blocks from the contents of its local email recipient list, compare the locally-generated list of hashed blocks to the list of hashed blocks received from the server replication component in order identify the hashed blocks that are different, and send to the server replication component the literal blocks of the local email recipient list that correspond to the hashed blocks that were identified to be different for updating in the target email recipient list. In this manner, the synchronization of the email recipient lists can be initiated by the server replication component.

In some embodiments, the replication system can detect when changes have been made to the email recipient lists. Upon detecting a change to, for example, the client email recipient list, the replication system can initiate synchronization of the email recipient lists. In some embodiments, the replication system can delay for a specified period of time after a change is detected before performing the synchronization of the email recipient lists. This allows for the capturing of additional changes in a single synchronization (update), while still maintaining (bounding) the latency on email recipient list propagation. In some embodiments, the replication system can retry the synchronization in case of failure due to, for example, network and/or service non-availability. For example, the replication system may be configured to synchronize the email recipient lists every four hours. In the case of an error during a scheduled synchronization, the replication system may retry the failed synchronization every fifteen minutes (or other predetermined period of time) until the synchronization succeeds, at which point the replication system returns to the normal synchronization schedule of every four hours.

In some embodiments, the email recipient lists may contain data that is associated with the email recipients. For example, the email recipient lists may contain a safe-sender list for some or all of the email recipients in the email recipient lists (e.g., a list of email recipients that are trusted by the email recipient). The replication system can detect when changes have been made to the data associated with the email recipients and synchronize email recipient lists to account for the changes. In order to detect differences in the data that is associated with the email recipients, this data can be included in the information that is used to generate the compressed view (e.g., hashed value). In some embodiments, the replication system can generate a compressed view of this data (i.e., the data that is associated with the email recipients) and use the generated compressed view to identify the data that is different.

One skilled in the art will appreciate that, for this and other processes and methods disclosed herein, the functions/steps performed in the processes and methods may be altered in various ways. For example, the order of the outlined steps is only exemplary, and the steps may be rearranged, some of the steps may be optional, substeps may be performed in parallel, some of the steps may be combined into fewer steps or expanded into additional steps, other steps may be included, etc.

Figure 3:
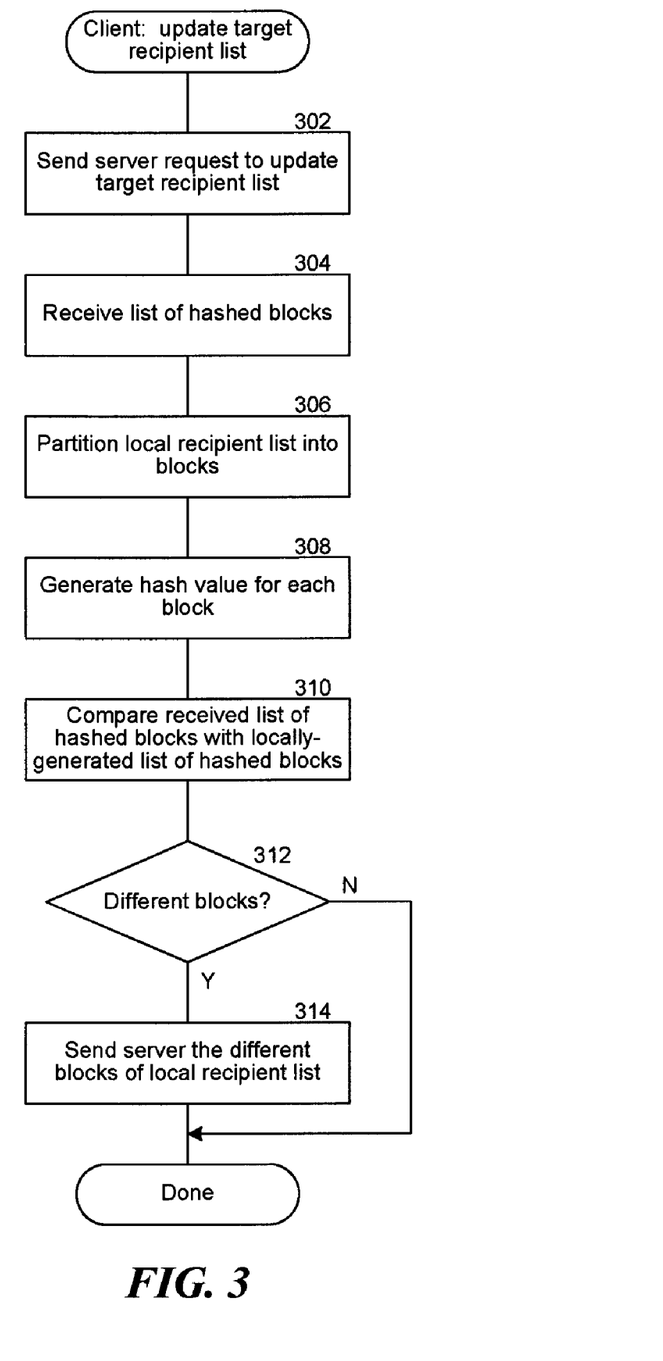
FIG. 3 is a flow diagram that illustrates the processing of a client component of the replication system to update a target recipient list, according to some embodiments.

FIG. 3 is a flow diagram that illustrates the processing of a client component of the replication system to update a target recipient list, according to some embodiments. The client replication component executing within the corporate cloud is invoked to replicate a local email recipient list onto a target email recipient list within the hosted email service cloud. In block 302, the client replication component sends to the server replication component executing within the hosted email services cloud a request to update the target email recipient list within the hosted email service cloud. The client replication component has access to the local email recipient list and the server replication component has access to the target email recipient list. In block 304, the client replication component receives a list of hashed blocks in response to its request to update the target email recipient list. The list of hashed blocks is a representation of the target email recipient list. In some embodiments, the client replication component may also receive information that specifies how the records in the target email recipient list was partitioned to create the blocks of records, which were used to generate the hashed blocks in the list of hashed blocks. In block 306, the client replication component partitions the records in the local email recipient list into blocks of records. In block 308, the client replication component generates a compressed view (e.g., a hash value) for each of the blocks of records. The client replication component uses the same technique that was used by the server replication component in generating the list of hashed blocks from the blocks of the target email recipient list. In block 310, the client replication component compares the list of hashed blocks received in response to the request to update the target email recipient list (the list of hashed blocks that represent the target email recipient list) with the locally-generated list of hashed blocks (the list of hashed blocks that represent the local email recipient list). In decision block 312, if none of the hashed blocks in the compared lists of hashed blocks are different, then the client replication component completes, else the client replication component continues at block 314. In block 314, the client replication component sends to the server replication component the blocks of the local email recipient list that correspond to the hashed blocks which were identified to be different. The client replication component then completes.

In some embodiments, the client replication component may concurrently send to the server replication component the request to update the target email recipient list and the blocks of the local email recipient list that correspond to the hashed blocks which were identified to be different. For example, in a multi-repartition approach, utilizing a depth-first search, the client replication component may have already identified a smallest block that the client replication component is going to send an update on (send the corresponding block of the local email recipient list) before the client replication component finishes the search for the smallest subblocks that differ. This allows the client replication component to make updates as soon as the differences are identified, and is likely to bring the client email recipient list and the target email recipient list into synchronization quicker. This also allows the synchronization process to be more resilient to intermittent failures which would have otherwise causes the synchronization process to restart without making any update progress.

Figure 4:
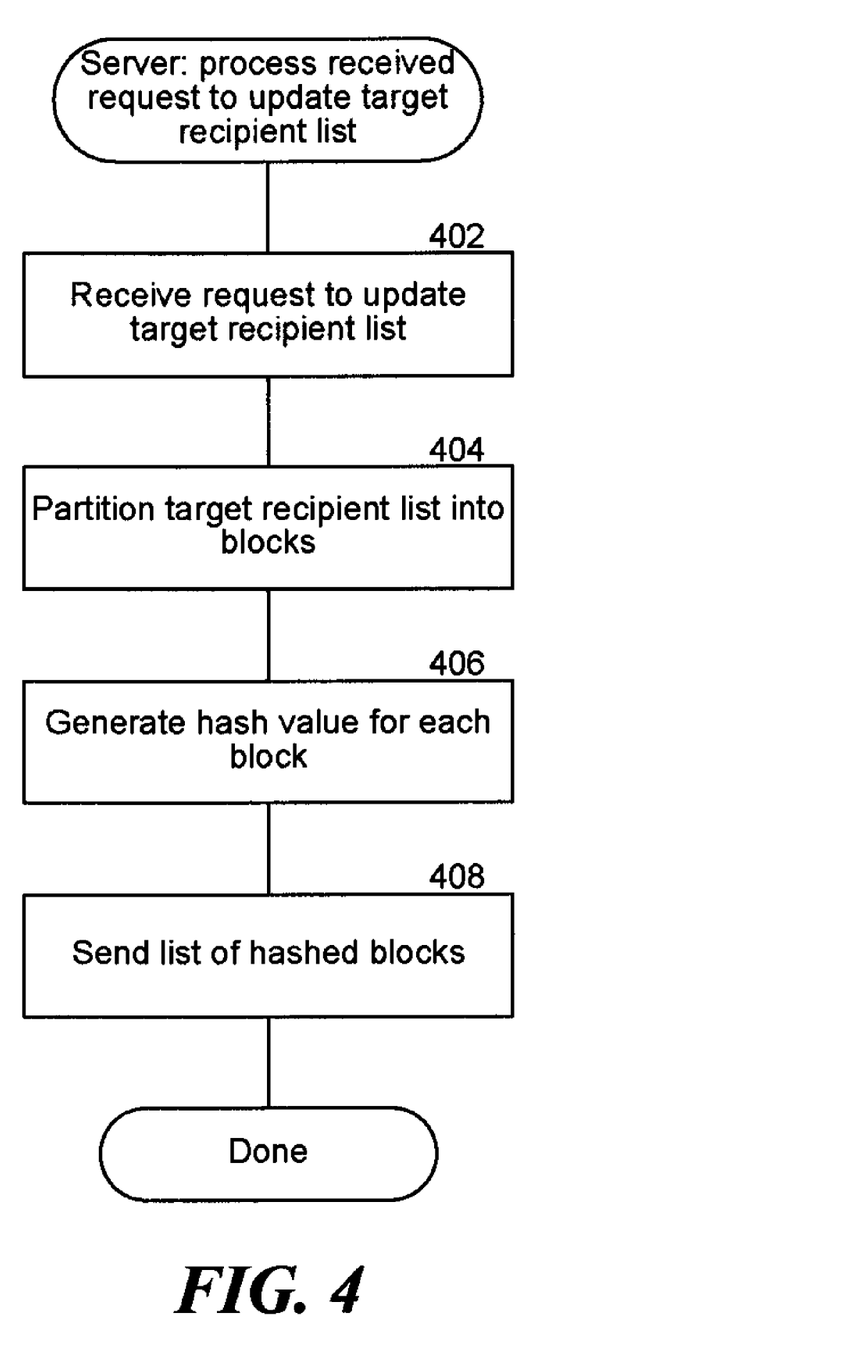
FIG. 4 is a flow diagram that illustrates the processing of a server component of the replication system to process a request to update a target recipient list, according to some embodiments.

FIG. 4 is a flow diagram that illustrates the processing of a server component of the replication system to process a request to update a target recipient list, according to some embodiments. The server replication component executing within the hosted email service cloud is invoked when a request to update the target email recipient list is received. The server replication component responds to the received request to update the target email recipient list by sending a list of hashed blocks that represent the target email recipient list. In block 402, the server replication component receives the request to update the target email recipient list. In block 404, the server replication component partitions the records in the target email recipient list into blocks of records. By way of example, the server replication component may partition the records according to the first letters of their respective email aliases (e.g., all of the email recipients having email aliases starting with the letter "a" or "A" in one block, all of the email recipients having email aliases starting with the letter "b" or "B" in another block, etc.). In some embodiments, the server replication component may limit each block to a predetermined maximum size (e.g., maximum number of records). For example, subsequent to partitioning the records in the target email recipient list according to the starting letters of the email aliases represented by the records, the server replication component can further partition the blocks that are larger that the predetermined maximum size. By way of example, assuming that the block of records for the email aliases starting with the letter "a" or "A" is 7,000 records, and the predetermined maximum size of any one block is 2,500 records, the server replication component can further partition the block of records for the email aliases starting with the letter "a" or "A" into blocks of 2,500 records, 2,500 records, and 2,000 records. In this technique, the last block may be less than the predetermined maximum size. In block 406, the server replication component generates a compressed view (e.g., a hash value) for each of the blocks of records. In block 408, the server replication component generates a list of hashed blocks using the compressed views of the blocks, and sends the list of hashed blocks in response to the received request to update the target email recipient list. The server replication component then completes.

Figure 5:
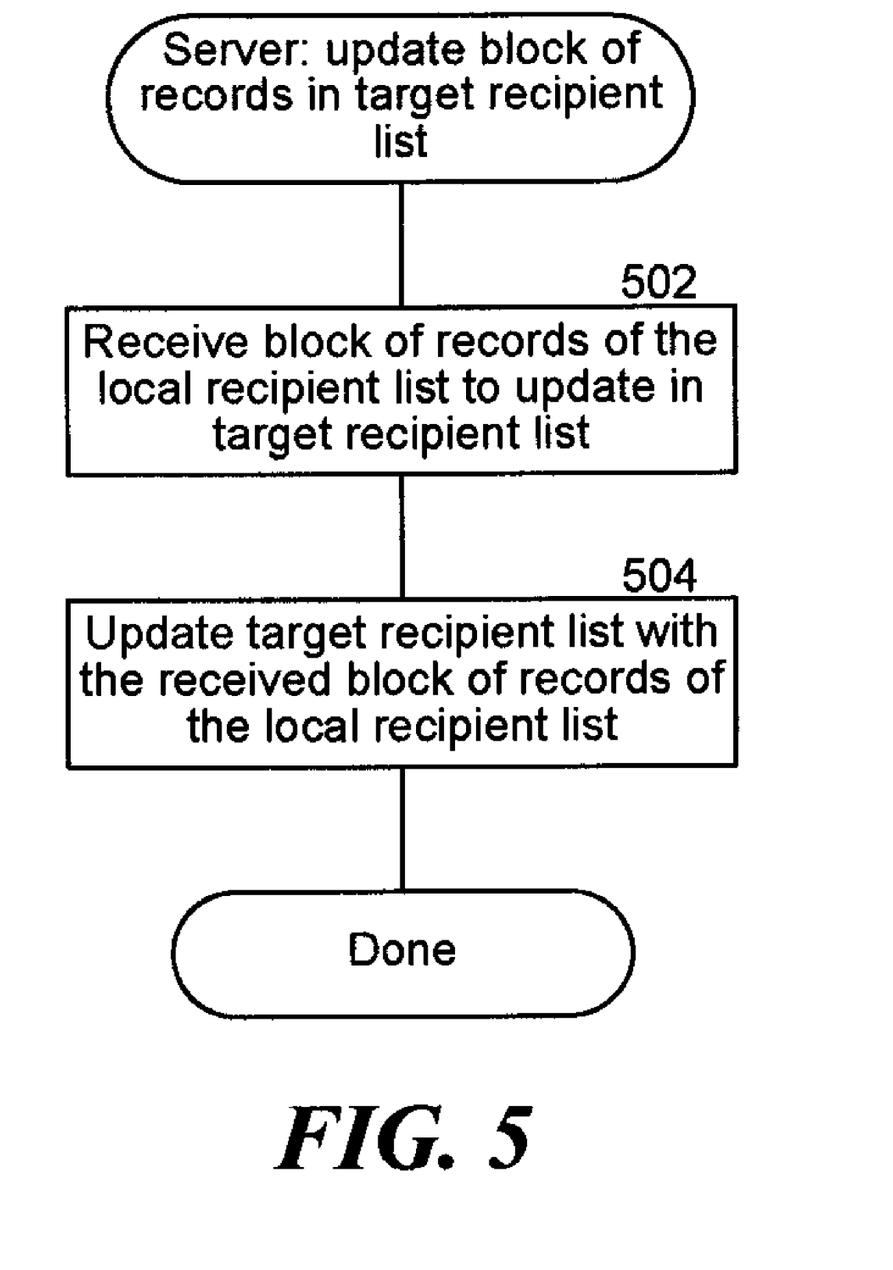
FIG. 5 is a flow diagram that illustrates the processing of the server component of the replication system to update blocks of records of a target recipient list, according to some embodiments.

FIG. 5 is a flow diagram that illustrates the processing of the server component of the replication system to update blocks of records of a target recipient list, according to some embodiments. The server replication component executing within the hosted email service cloud is invoked when a block of records of the local email recipient list is received for updating the target email recipient list. For example, the block of records of the local email recipient list may have been received from the client replication component in response to sending the list of hashed blocks in response to a request to update the target email recipient list. In block 502, the server replication component receives a block of records of the local email recipient list to update in the target email recipient list. The server replication component may receive a multiple number of blocks of records of the local email recipient list. In block 504, the server replication component updates (replaces) the block of records of the target email recipient list that correspond to the received block of records of the local email recipient list with the received block of records of the local email recipient list. If the server replication component received multiple blocks of records of the local email recipient list, the server replication component updates the blocks of records of the target email recipient list that correspond to each of the received blocks of records of the local email recipient list with the appropriate received blocks of records of the local email recipient list. When the appropriate blocks of the target email recipient list is updated with the received blocks of the local email recipient list, the updated target email recipient list becomes synchronized with the local email recipient list. The server replication component then completes.

Figure 6:
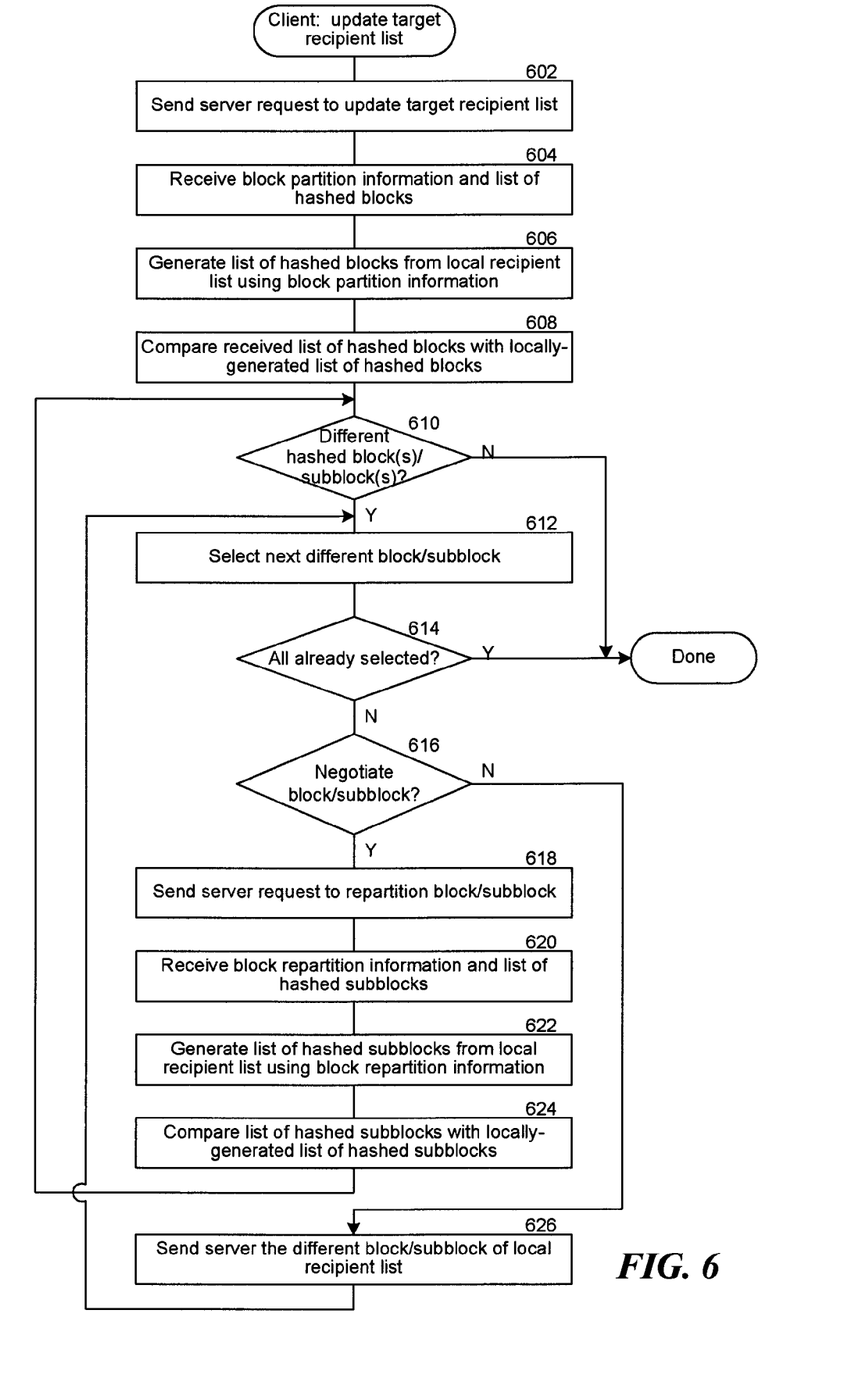
FIG. 6 is a flow diagram that illustrates the processing of the client component of the replication system to update a target recipient list, according to some embodiments.

FIG. 6 is a flow diagram that illustrates the processing of the client component of the replication system to update a target recipient list, according to some embodiments. The client replication component executing within the corporate cloud is invoked to replicate a local email recipient list onto a target email recipient list within the hosted email service cloud. The client replication component requests negotiation of the larger blocks of the email recipient lists that are different into smaller blocks or subblocks of records in order to further pinpoint or isolate the differences between the local email recipient list and the target email recipient list, thus further reducing the amount of data that needs to be transmitted in order to replicate the local email recipient list onto the target email recipient list. In block 602, the client replication component sends to the server replication component executing within the hosted email services cloud a request to update the target email recipient list within the hosted email service cloud. In block 604, the client replication component receives block partition information and a list of hashed blocks in response to its request to update the target email recipient list. The list of hashed blocks is a representation of the target email recipient list. The block partition information specifies how the records in the target email recipient list were partitioned to create the blocks of records, which were used to generate the hashed blocks in the list of hashed blocks. In block 606, the client replication component uses the received block partition information to partition the records in the local email recipient list and, from the partitioned blocks of records, the client replication component generates a list of hashed blocks. The locally-generated list of hashed blocks represents the local email recipient list. In block 608, the client replication component compares the list of hashed blocks received in response to the request to update the target email recipient list (the list of hashed blocks that represent the target email recipient list) with the locally-generated list of hashed blocks (the list of hashed blocks that represent the local email recipient list). In decision block 610, if none of the hashed blocks in the compared lists of hashed blocks are different, then the client replication component completes, else the client replication component continues at block 612. In block 612, the client replication component selects the next different hashed block. In decision block 614, if all of the different hashed blocks have already been selected, then the client replication component completes, else the client replication component continues at decision block 614. In decision block 614, the client replication component checks to determine whether to request further negotiation of the block of records that corresponds to the different hashed block into smaller blocks of records. For example, the client replication component may request negotiation of blocks of records that exceed a predetermined number of records, such as, by way of example, 1,000 records, into smaller blocks of records. If the client replication component determines to not request negotiation of the block of records that corresponds to the different hashed block into smaller blocks of records, then, in block 626, the client replication component sends to the server replication component the block of the local email recipient list that corresponds to the different hashed block. The client replication component then loops to block 612 to select the next different hashed block. If, in decision block 616, the client replication component determines that it should request negotiation of the block of records that corresponds to the different hashed block into smaller blocks of records, then, in block 618, the client replication component sends to the server replication component a request to repartition a specified block of records of the target email recipient list into subblocks of records. The specified block of records of the target email recipient list is the block of records that corresponds to the different hashed block. In block 620, the client replication component receives block repartition information and a list of hashed subblocks in response to its request to repartition the specified block of records of the target email recipient list. The list of hashed subblocks is a representation of the specified block of records of the target email recipient list. The block repartition information specifies how the records in the specified block of records of the target email recipient list were partitioned to create the subblocks of records, which were used to generate the hashed subblocks in the list of hashed subblocks. In block 622, the client replication component uses the received block repartition information to repartition the records in the block of records of the local email recipient list that corresponds to the different hashed block into subblocks of records and, from the subblocks of records, the client replication component generates a list of hashed subblocks. The locally-generated list of hashed subblocks represents the block of records of the local email recipient list that corresponds to the different hashed block. In block 624, the client replication component compares the list of hashed subblocks received in response to the request to repartition the specified block of records of the target email recipient list with the locally-generated list of hashed subblocks. The client replication component then loops to decision block 610 to identify the different hashed subblocks. For each different hashed subblock, the client replication component performs blocks 612 to 626 to send to the server replication component either (1) the subblock of records of the local email recipient list that corresponds to the different hashed subblock, or (2) a request to further repartition a specified subblock of records of the target email recipient list into succeeding subblocks of records.

Figure 7:
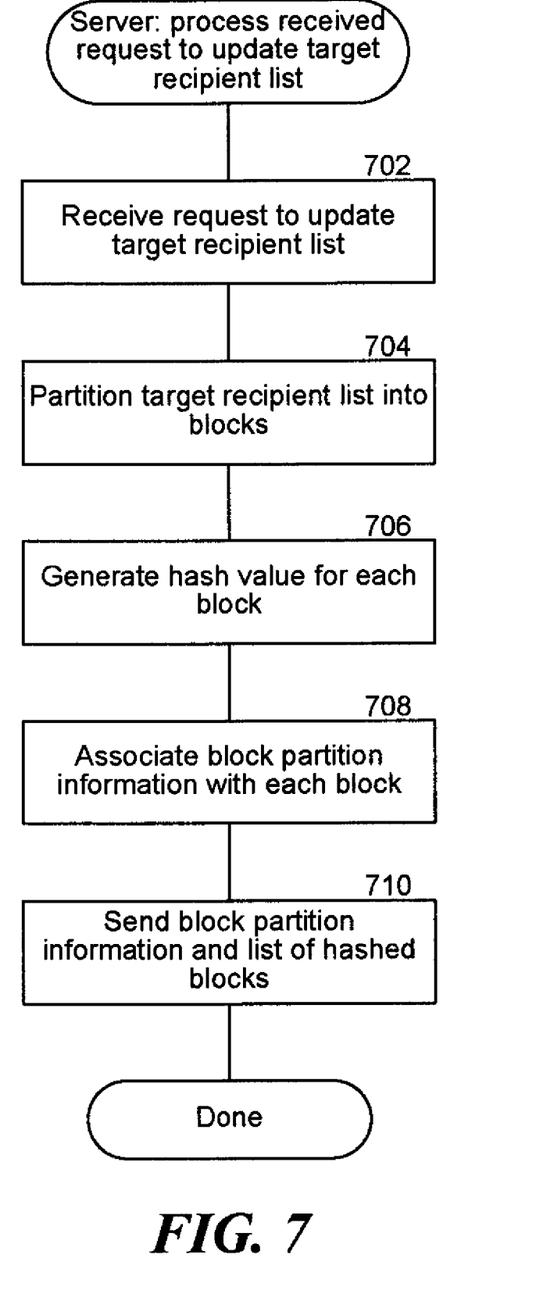
FIG. 7 is a flow diagram that illustrates the processing of the server component of the replication system to process a request to update a target recipient list, according to some embodiments.

FIG. 7 is a flow diagram that illustrates the processing of the server component of the replication system to process a request to update a target recipient list, according to some embodiments. The server replication component executing within the hosted email service cloud is invoked when a request to update the target email recipient list is received. The server replication component responds to the received request to update the target email recipient list by sending a list of hashed blocks that represent the target email recipient list and block partition information that specifies how the records in the target email recipient list were partitioned to create the blocks of records used to generate the hashed blocks in the list of hashed blocks. In block 702, the server replication component receives the request to update the target email recipient list. In block 704, the server replication component partitions the records in the target email recipient list into blocks of records. In block 706, the server replication component generates a compressed view (e.g., a hash value) for each of the blocks of records. In block 708, the server replication component generates block partition information for each block of records. The block partition information for a block of records specifies how that particular block of records was created from the records of the target email recipient list. In block 710, the server replication component generates a list of hashed blocks using the compressed views of the blocks, and sends the block partition information and the list of hashed blocks in response to the received request to update the target email recipient list. The server replication component then completes.

Figure 8:
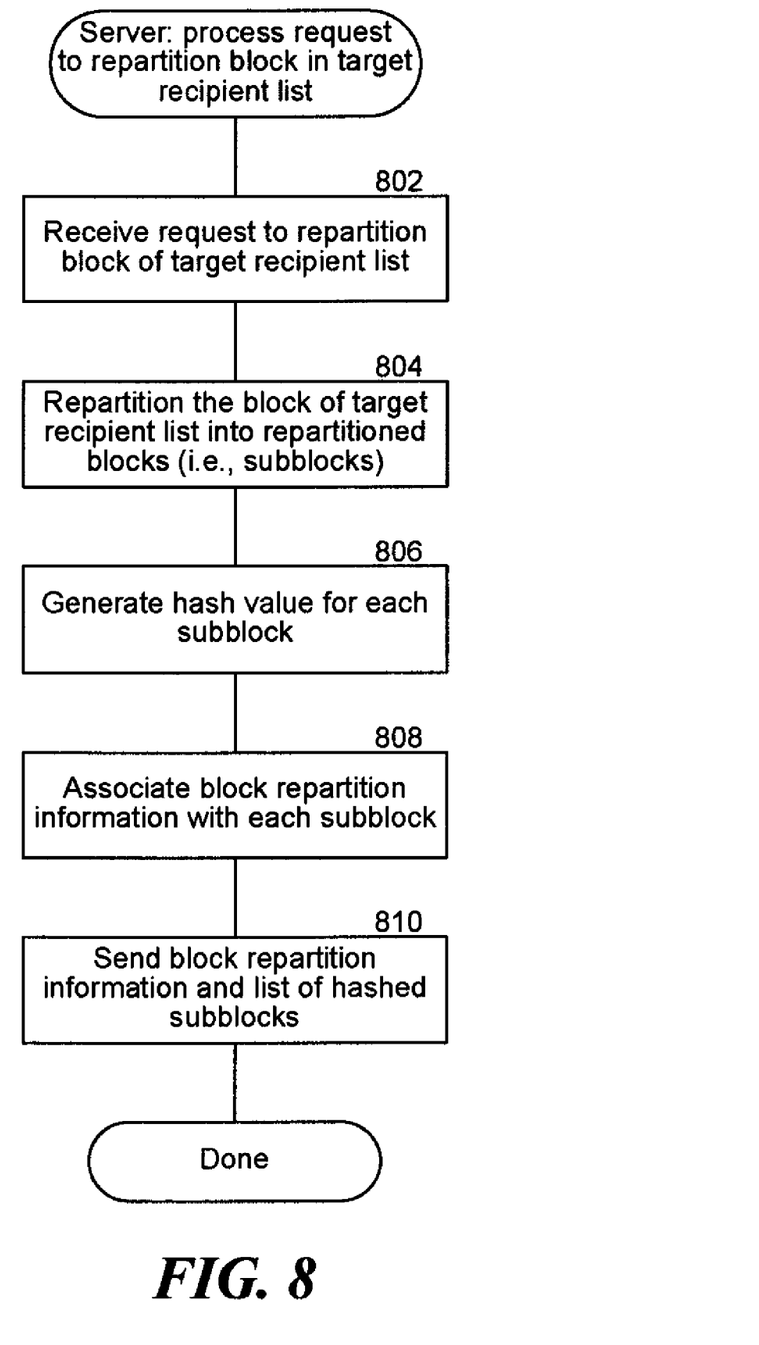
FIG. 8 is a flow diagram that illustrates the processing of the server component of the replication system to process a request to repartition a block of records of a target recipient list, according to some embodiments.

FIG. 8 is a flow diagram that illustrates the processing of the server component of the replication system to process a request to repartition a block of records of a target recipient list, according to some embodiments. The server replication component executing within the hosted email service cloud is invoked when a request to repartition a specified block of records of the target email recipient list is received. The server replication component responds to the received request to repartition the specified block of records of the target email recipient list by sending a list of hashed subblocks that represent the specified block of the target email recipient list and block repartition information that specifies how the records in the specified block of the target email recipient list were repartitioned to create the subblocks of records used to generate the hashed subblocks in the list of hashed subblocks. In block 802, the server replication component receives the request to repartition a specified block of records of the target email recipient list. In block 804, the server replication component repartitions the records in the specified block of records of the target email recipient list into subblocks of records. In block 806, the server replication component generates a compressed view (e.g., a hash value) for each of the subblocks of records. In block 808, the server replication component generates block repartition information for each subblock of records. The block repartition information for a subblock of records specifies how that particular subblock of records was created from the records of the specified block of records of the target email recipient list. In block 810, the server replication component generates a list of hashed subblocks using the compressed views of the subblocks, and sends the block repartition information and the list of hashed subblocks in response to the received request to repartition a specified block of records of the target email recipient list. The server replication component then completes.

In some embodiments, the client replication component may provide to the server replication component block repartition information that specifies how the server replication component is to further partition a specified block of records of the target email recipient list. The server replication component can then use the block repartition information specified by the client replication component to further partition the specified block of records of the target email recipient list.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. For example, although the replication system has been described as replicating a local email recipient list onto a target email recipient list, the replication system can replicate the target email recipient list onto the local email recipient list. Further, although the replication system has been described as replicating email recipient lists, the replication system can replicate lists of other types of records that need to be replicated from a source location to a destination location. In some instances, steps have been described as being performed by the client replication component within the corporate cloud, but they could also be performed by other components at various machines within the corporate cloud. Similarly, steps have been described as being performed by the server replication component within the hosted email service cloud, but they could also be performed by other components at various machines within the hosted email service cloud. Accordingly, the invention is not limited except as by the appended claims.

We claim:

1. A computer-implemented method performed by a first device for replicating an email recipient list, the method comprising:

receiving from a second device a first list of hashed blocks, each hashed block in the first list of hashed blocks being a compressed view of a block of records of a target email recipient list;

receiving from the second device block partition information specifying partitioning of the target email recipient list into blocks of records from which the first list of hashed blocks was generated;

after receiving the block partition information from the second device, generating by the first device a second list of hashed blocks from blocks of records of a local email recipient list based on the block partition information received from the second device so that the first device and the second device partition using the same technique and so that the first device does not require prior knowledge of the technique used by the second device;

comparing the first list of hashed blocks to the second list of hashed blocks, each hashed block in the second list of hashed blocks being a compressed view of a block of records of the local email recipient list;

identifying hashed blocks in the first list of hashed blocks that are different from their corresponding hashed blocks in the second list of hashed blocks;

for each different hashed block, sending to the second device the corresponding block of records of the local email recipient list; and for at least one different hashed block, sending a request to repartition the block of records of the target email recipient list corresponding to the different hashed block, such that each sent block of records of the local email recipient list results in updating the corresponding block of records of the target email recipient list.

2. The method of claim 1, wherein the compressed view is a hash value.

3. The method of claim 1, wherein each block of records of the target email recipient list is a range of records in the target email recipient list.

4. The method of claim 3, wherein each range of records is determined based on an alphabetized ordering of the records in the target email recipient list.

5. The method of claim 3, wherein the range of records is ordered based on a predetermined random identifier associated with the records.

6. The method of claim 1, wherein the block partition information for each hashed block specifies a beginning record, an ending record, and a number of records in the block of records corresponding to the hashed block.

7. The method of claim 1 further comprising:

in response to sending the request to repartition the block of records of the target email recipient list corresponding to the different hashed block, receiving a list of hashed subblocks, each hashed subblock in the list of hashed subblocks being a compressed view of a subblock of the records of the target email recipient list corresponding to the different hashed block; and receiving block repartition information for each subblock in the list of hashed subblocks, wherein the block repartition information specifies the repartitioning of the records of the target email recipient list corresponding to the different hashed block for generating the list of hashed subblocks;

using the received block repartition information to generate a local list of hashed subblocks, each hashed subblock in the local list of hashed subblocks being a compressed view of a subblock of the records of the local email recipient list corresponding to the different hashed block;

identifying hashed subblocks in the local list of hashed subblocks that are different than their corresponding hashed subblocks in the received list of hashed subblocks.

8. The method of claim 7 further comprising, for each different hashed subblock, sending the corresponding subblock of records of the different block of records of the local email recipient list, such that the sent subblock of records of the different block of records of the local email recipient list updates the corresponding subblock of records of the different block of records of the target email recipient list.

9. A computer-implemented method performed by a first device for replicating an email recipient list, the method comprising:

receiving from a second device a request to update the email recipient list, the request including block partition information specifying a partitioning technique for partitioning records of the email recipient list into blocks of records; and in response to receiving the request, partitioning the email recipient list into blocks of records based on the block partition information received from the second device so that the first device and the second device partition using the same technique and so that the first device does not require prior knowledge of the technique used by the second device;

generating a compressed value for each of the blocks of records;

sending a list of hashed blocks in response to the request, wherein the list of hashed blocks is a list of the compressed values for each of the blocks of records of the email recipient list such that the list of hashed blocks is used to identify blocks of records of the email recipient list that are different from corresponding blocks of records in a source email recipient list; and receiving a request to repartition a specified block of records of the email recipient list, the specified block having been identified as being different from the corresponding block of records in the source email recipient list.

10. The method of claim 9, wherein a compressed value is a hash value of the block of records.

11. The method of claim 9, wherein each block of records of the email recipient list is a range of records.

12. The method of claim 11, wherein each range of records is determined based on an alphabetized ordering of the records in the email recipient list.

13. The method of claim 11, wherein each range of records is ordered based on a predetermined random identifier associated with the records.

14. The method of claim 9 further comprising:

in response to receiving the request to repartition the specified block of records, repartitioning the specified block of records into subblocks of records;

generating a compressed value for each of the subblocks of records; and sending a list of hashed subblocks in response to the request to repartition the specified block of records, wherein the list of hashed subblocks is a list of the compressed values for each of the subblocks of records of the specified block of records of the email recipient list.

15. A non-transitory computer-readable storage media containing instructions for controlling a first device to replicate an email recipient list, by a method comprising:

sending to a second device a request to update a target email recipient list;

receiving from the second device a first list of hashed blocks, each hashed block in the first list of hashed blocks being a compressed view of a block of records of the target email recipient list;

receiving from the second device block partition information specifying partitioning of the target email recipient list into blocks of records from which the first list of hashed blocks was generated; and after receiving the block partition information from the second device, generating by the first device a second list of hashed blocks from blocks of records of a local email recipient list based on the block partition information received from the second device so that the first device and the second device partition using the same technique and so that the first device does not require prior knowledge of the technique used by the second device comparing the first list of hashed blocks to the second list of hashed blocks, each hashed block in the second list of hashed blocks being a compressed view of a block of records of the local email recipient list;

identifying hashed blocks in the first list of hashed blocks that are different from their corresponding hashed blocks in the second list of hashed blocks;

for each different hashed block, sending to the second device the corresponding block of records of the local email recipient list for updating on the target email recipient list; and for at least one different hashed block, sending a request to repartition the block of records of the target email recipient list corresponding to the different hashed block.

16. The non-transitory computer-readable storage media of claim 15, further comprising:

for each different hashed block, determining whether to request repartitioning of the block of records of the target email recipient list corresponding to the different hashed block;

upon determining to request repartitioning of the block of records of the target email recipient list corresponding to the different hashed block, sending the request to repartition the block of records of the target email recipient list corresponding to the different hashed block.

17. The non-transitory computer-readable storage media of claim 16, further comprising:

receiving a list of hashed subblocks, each hashed subblock in the received list of hashed subblocks being a compressed view of a subblock of the records of the target email recipient list corresponding to the different hashed block;

comparing the received list of hashed subblocks to a local list of hashed subblocks, each hashed subblock in the local list of hashed subblocks being a compressed view of a subblock of the records of the local email recipient list corresponding to the different hashed block;

identifying hashed subblocks in the local list of hashed subblocks that are different than their corresponding hashed subblocks in the received list of hashed subblocks; and for each different hashed subblock, sending the corresponding subblock of records of the local email recipient list for updating on the target email recipient list.

* * * * *

UNITED STATES PATENT AND TRADEMARK OFFICE
CERTIFICATE OF CORRECTION

PATENT NO. : 7,650,394 B2
APPLICATION NO. : 11/532352
DATED : January 19, 2010
INVENTOR(S) : Pearson et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 547 days.

Signed and Sealed this

Twenty-eighth Day of December, 2010

David J. Kappos
*Director of the United States Patent and Trademark Office*